United States Patent [19]

Rosenwasser et al.

[11] Patent Number: 5,753,887
[45] Date of Patent: May 19, 1998

[54] APPARATUS FOR LASER ENGRAVING INDICIA ON GEMSTONES

[75] Inventors: Joel Rosenwasser, Dresher, Pa.; James Geswelli, Florham Park; Todd Knichel, Hackettstown, both of N.J.

[73] Assignee: Engraving Technologies, Inc., Horsham, Pa.

[21] Appl. No.: 442,219

[22] Filed: May 16, 1995

[51] Int. Cl.⁶ .................................................. B23K 26/00
[52] U.S. Cl. ............................... 219/121.68; 219/121.82
[58] Field of Search .......................... 219/121.6, 121.68, 219/121.69, 121.82, 121.85; 63/32; 125/30.01, 35

[56] References Cited

U.S. PATENT DOCUMENTS

| | | | |
|---|---|---|---|
| 3,527,198 | 9/1970 | Takaoka | 125/30.01 |
| 3,601,576 | 8/1971 | Schlafli et al. | 219/121.71 |
| 4,219,199 | 8/1980 | Okuda | 63/32 |
| 4,392,476 | 7/1983 | Gresser et al. | 125/30.01 |
| 4,401,876 | 8/1983 | Cooper | 219/121.69 |
| 4,443,685 | 4/1984 | Seman | 219/121.68 |
| 4,467,172 | 8/1984 | Ehrenwald et al. | 219/121.68 |
| 5,012,067 | 4/1991 | Sato et al. | 219/121.72 |
| 5,423,714 | 6/1995 | Lach | 451/57 |

FOREIGN PATENT DOCUMENTS

| | | |
|---|---|---|
| 877326 | 12/1979 | Belgium . |
| 2423750 | 11/1975 | Germany . |
| 56-86694 | 7/1981 | Japan . |
| 2-30393 | 1/1990 | Japan . |
| 2052369 | 1/1981 | United Kingdom . |
| 2194913 | 3/1988 | United Kingdom . |
| 90/01393 | 2/1990 | WIPO . |

*Primary Examiner*—Teresa J. Walberg
*Assistant Examiner*—Gregory L. Mills
*Attorney, Agent, or Firm*—Caesar, Rivise, Bernstein, Cohen & Pokotilow, Ltd.

[57] ABSTRACT

Apparatus and methods for engraving indicia on gemstones and the gemstones created thereby. The indicia may be either decorative indicia, readily visible to the naked eye, or identification indicia, invisible to the naked eye, and is engraved on or adjacent a predetermined exterior surface portion of the gemstone. The gemstone may be semi-precious, man-made, or precious and has another exterior surface portion for engagement by a portion of the apparatus. The apparatus basically comprises a support for supporting the gemstone and laser device for generating a laser beam and for directing it beam to the predetermined exterior surface of the gemstone to engrave the indicia therein. The support is constructed to engage the other exterior surface portion of the gemstone in such a manner that a significant portion of the laser beam is precluded by the support from reflecting internally within the gemstone, thereby ensuring that the gemstone is not damaged by the laser beam. The support can comprise either a fixture for engaging only the periphery of the gemstone or may comprise base having a recess therein for engaging the entire underside of the gemstone. In either case the support is formed of a laser-light transmissive material. A laser-light absorbing coating is preferably applied to the surface of the gemstone which is to be engraved by the laser beam.

7 Claims, 2 Drawing Sheets

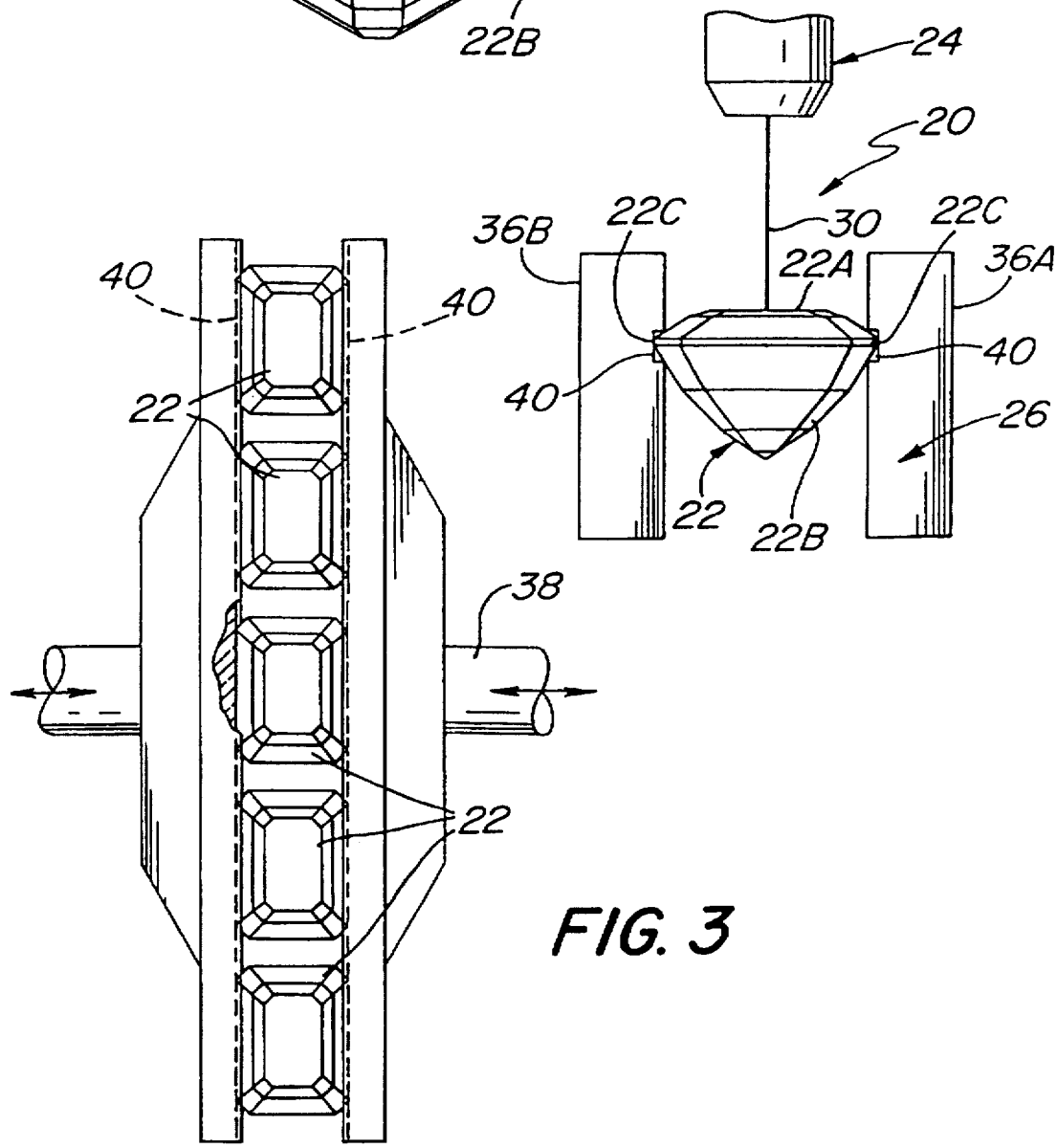

APPARATUS FOR LASER ENGRAVING INDICIA ON GEMSTONES

BACKGROUND OF THE INVENTION

This invention relates generally to the making of jewelry, and more particularly to apparatus and methods for engraving indicia on precious and semi-precious and synthetic gemstones by means of a laser, and the gemstones produced thereby.

There have been many attempts at applying laser-induced indicia on the surfaces of gemstones. In practice, the only successful application of this concept has been the application of identifying indicia on the surface, specifically, the girdle, of a diamond. Diamonds, being the most expensive and most desired gemstone, have been successfully engraved with this form of indicia to provide a serial number or associated appraisal number that contains the full description of the characteristic of the particular diamond on its girdle. In order to be invisible to the naked eye the height of each of the characters making up the serial number or appraisal number is extremely small, e.g. 0.0025 inch (0.064 mm).

The application of indicia by laser to a gemstone surface has heretofore typically required that the target surface not be polished, i.e., be of somewhat rough finish in order to absorb the laser energy. Alternately and more commonly the target surface has a laser-light absorptive coating of some material, e.g. paint or ink, thereon. This coating is arranged to be removed after the indicia has been engraved onto the target surface by the laser beam. As will be appreciated by those skilled in the art, the rough or coated surface absorbs the energy of the laser beam impinging it to, thereby, vaporizing it and the underlying gemstone material.

While the above described process has proven successful in the practice for marking of diamonds with very tiny identification indicia, it has not been used to produce large engravings, e.g. decorative indicia, on the major facets of diamonds or other gemstones, particularly semi-precious or man-made gemstones. The reason for such limited use is because of high losses incurred in producing indicia render the practice too costly to be practical on a mass production basis on lower value gemstones.

U.S. Pat. Nos. 4,392,476 (Gresser et al.), 4,467,172 (Ehrenwald), and 5,149,938 (Winston et al.), all disclose the application of indicia to the edge of a diamond to mark the serial type thereon. None of the foregoing patents addresses the concerns of marking semi-precious gemstones, like zirconia, topaz, sapphire, the like. These stones have a significantly different stature in the jewelry industry, and the application of a laser to mark serial numbers on the girdles of such stones would not be practical, since the cost for inexpensive semi-precious and man-made stones would be greater than the cost of applying a laser beam to them.

However, such stones are ideal candidates for decorative markings on any particular facets of these stones, since typically they are much larger than diamonds. Thus, the prior art does not deal with the problems incurred by applying indicia to the table or large pavilion facets commonly found on these stones. In particular, the application of large indicia markings on a semi-precious gemstone by laser is fraught with peril of damaging the stone due to buildup caused by internal reflections of the laser beam within the stone.

OBJECTS OF THE INVENTION

Accordingly, it is a general object of this invention to provide apparatus and methods of use which overcomes the disadvantages of the prior art and which addresses the needs of the jewelry industry for decorated gemstones.

It is another object of this invention to provide a method of applying indicia at or below an exterior surface of a gemstone by a laser beam, without risking damage to the gemstone.

It is still another object of this invention to provide a method of applying indicia to an exterior surface of a gemstone by a laser beam, by supporting the gemstone with respect to the laser beam in such a manner that internal reflections of that beam within the gemstone are minimized, to preclude heat-induced damage thereto.

It is still another object of this invention to provide simple and low cost apparatus for use with a laser for applying indicia to an exterior surface of a gemstone by a laser beam, by supporting the gemstone with respect to the laser beam in such a manner that internal reflections of that beam within the gemstone are minimized.

It is yet another object of this invention to provide gemstones bearing laser-applied indicia on an exterior surface thereof.

SUMMARY OF THE INVENTION

These and other objects of this invention are achieved by providing apparatus and methods for engraving indicia on gemstones, and the gemstones created thereby. The indicia may be either decorative indicia, readily visible to the naked eye, or identification indicia, invisible to the naked eye. In either case the indicia is engraved on a predetermined exterior surface portion of the gemstone. That exterior surface portion comprises an upper portion of the gemstone. For example, in the case where the indicia is decorative and the gemstone is semi-precious or man-made, the upper portion of the gemstone which is engraved comprises its table. In the case where the indicia is identifying-indicia to be invisible to the naked eye, e.g., a serial number or description of the gemstone, and the gemstone is precious gemstone, e.g., a diamond, the upper portion of the gemstone which is engraved comprises the girdle.

The apparatus basically comprising support means for supporting the gemstone thereon and laser means for generating a laser beam and for directing the beam to the predetermined, e.g., upper, exterior surface of the gemstone to engrave the indicia into that surface. The support means is constructed to engage the other exterior surface portion of the gemstone in such a manner that a significant portion of the laser beam reaching the gemstone is precluded by the support means from reflecting internally within the gemstone, thereby ensuring that the gemstone is not damaged by the laser beam.

In accordance with a preferred embodiment of this invention the support means may comprise either a fixture (e.g., a clamping device) for engaging only a peripheral portion of the gemstone, or a base having a recess therein for engaging the entire underside of the gemstone.

DESCRIPTION OF THE DRAWINGS

Other objects and many attendant features of this invention will become readily appreciated as the same becomes better understood by reference to the following detailed description when considered in connection with the accompanying drawings wherein:

FIG. 1 is a side elevational view of the process of engraving a gemstone using one embodiment of the apparatus of this invention;

FIG. 2 is an enlarged isometric view of a gemstone of the subject invention, which has been engraved with decorative indicia using the apparatus of the subject invention and in accordance with the method of the subject invention;

FIG. 3 is a reduced top plan view of one embodiment of the apparatus of this invention supporting plural gemstones for engraving;

DETAILED DESCRIPTION OF THE PREFERRED EMBODIMENTS

Figure 4:
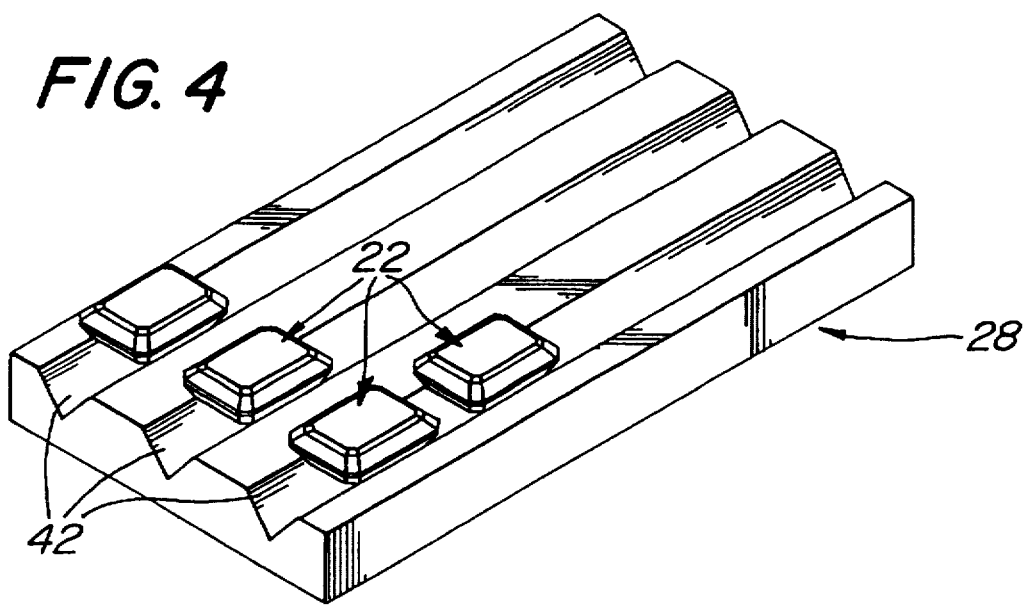
FIG. 4 is an isometric view of a second embodiment of the apparatus of this invention supporting plural gemstones for engraving.

Referring now to various figures of the drawing where like reference numerals refer to like parts there is shown at 20 in FIG. 1, a system for engraving a portion of the exterior surface of a gemstone 22 with a laser beam. The system basically comprises a conventional industrial beam-steered laser marking apparatus 24, such as that commercially available from Excel Control Laser, Inc. of Orlando, Fla. under the trade designation INSTAMARK Laser Marking System, and a gemstone support or holder 26 or 28 (FIGS. 1 and 4, respectively) constructed in accordance with this invention. The laser marking apparatus 24 includes a Nd-YAG laser (or other laser, such as a $CO_2$) for producing a finely focussed laser beam 30. The beam 30 is arranged to be directed by the apparatus 24 to the surface of some material to be engraved. In this application that surface consists of a portion of the exterior surface of a gemstone 22 (precious, semi-precious, or man-made).

In accordance with one preferred embodiment of this invention the gemstone comprises a semi-precious or man-made gemstone whose upper surface, e.g., crown or bezel 22A, or lower surface 22B, e.g., pavilion, is to be engraved by the laser beam 30. The gemstone 22 is arranged to be supported or held so that the surface 22A to be engraved can be impinged and traversed by the laser beam 30. The support for the gemstone during this procedure is provided by either the holder 26 or 28.

The details of the holders 26 and 28 will be described later. Suffice it for now to state that each holder is arranged to hold and support plural gemstones 22 therein for engraving by the laser beam. Moreover, each of the holders is constructed so that it will enable the laser beam which impinges on the surface 22A to be engraved to engrave the gemstone material underlying that surface, and then to readily exit the gemstone, without substantial internal reflection. This action is of extreme importance to ensure that the hazard of heat-induced damage to the gemstone is minimized, if not altogether eliminated.

The following constitutes a description of the process for engraving the table 22A, i.e., the top surface of the crown or bezel, of semi-precious or man-made gemstones 22 with large decorative indicia 10 to produce gemstones like that shown in FIG. 2. As can be seen in that figure the decorative indicia 10 constitutes the word "LOVE." This is purely exemplary of any type of large decorative indicia, letters or graphics or both, which can be engraved on the gemstone.

Figure 6:
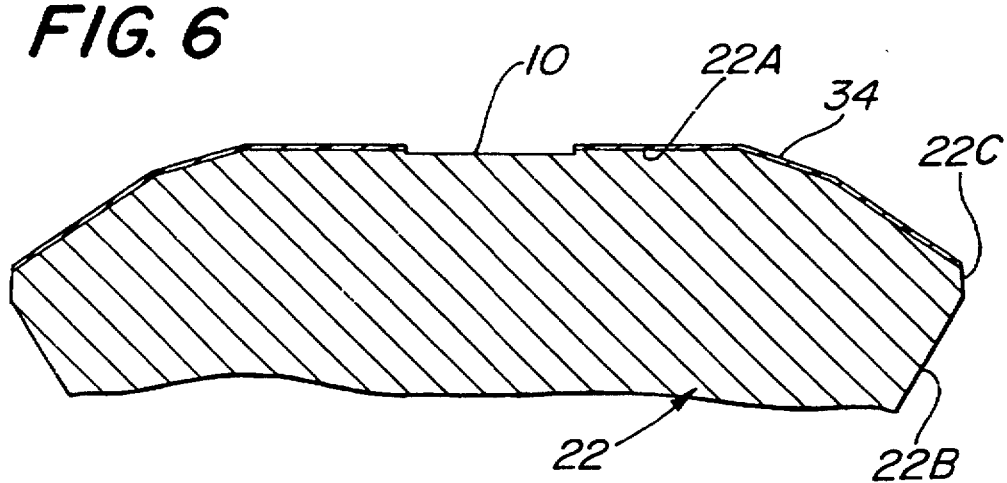
FIG. 6 is an enlarged, vertical sectional view of a gemstone which has been coated so that it can be readily engraved in accordance with the subject invention.

In order to engrave the table 22A of the gemstone it has applied thereto any suitable laser-light absorptive coating 34, e.g., paint, ink, or dye as shown in FIG. 6. The coated gemstones 22 are then mounted in the holder 26 or 28 in a manner to be described later, wherein their surfaces to be engraved are directed upward toward the laser apparatus 24. It should be noted that the use of a coating 34 is not mandatory. Thus, in some applications the stone to be engraved is uncoated.

Before describing the engraving process further a description of the details of the holders 26 and 28 is in order. Thus, as can be seen clearly in FIGS. 1 and 3, the holder 26 basically comprises a pair of elongated jaws 36A and 36B, and means, e.g., threaded screws 38 for moving the jaws 36A and 36B towards and away from each other to form a vice-like arrangement. Each of the jaws includes a linear groove or recess 40 extending along the length thereof so that the grooves are aligned directly opposite each other as shown in FIGS. 1 and 3. The grooves 40 are arranged to receive respective peripheral portions of the girdle 22C of the plural gemstones 22 to be engraved, as shown in FIG. 3. By tightening the screws 38 the jaws 36A and 36B are brought closer together to tightly hold the plural gemstones 22 in position, with their coated tables 22A facing upward for impingement by the laser beam 26.

In the interests of ensuring that internal reflections within the gemstones 22 are minimized during the engraving process, the jaws 36A and 36B, or at least portions contiguous with the grooves 40, are formed of a laser-light transmissive, e.g., transparent, material. One such material comprises the plastic, such as, polycarbonate, or any other transparent plastic or glass.

Figure 5:
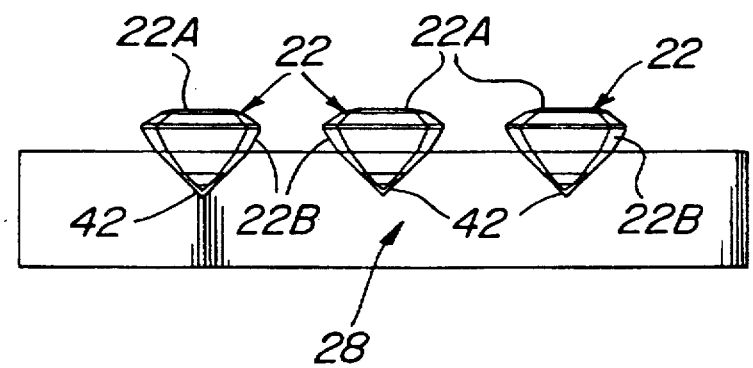
FIG. 5 is a side elevational view of the second embodiment of the apparatus of this invention shown in FIG. 4.

Referring now to FIGS. 4 and 5 the details of holder 28 will now be described. There, as can be seen therein the holder 26 basically comprises a generally planar base having plural recesses or grooves 42 extending along the length thereof. The recesses are arranged to receive the pavilion portion of the gemstones 22 to be engraved by the laser beam 30. To that end each groove 42 is of a general V-shape. In the interests of ensuring that internal reflections within the gemstones 22 are minimized during the engraving process, the base, or at least portions contiguous with the grooves 42, is formed of a laser-light transmissive material, like that described above with reference to holder 26.

With the coated gemstones 22 in either holder 26 or 28, the holder is then placed on some support or table (not shown) disposed in the path of the laser beam 30 so that the coated surface 22A of the gemstones is the appropriate distance away from the laser, i.e., the coated surface is in the focal plane of the laser beam. The laser beam is then directed across the coated surface of a first of the gemstones to be engraved to thereby produce the desired decorative indicia, e.g., the word "LOVE." In particular, the laser beam impinges the non-reflective coating on the gemstone's table to vaporize that coating and engrave the underlying surface of the gemstone, i.e., the material of the gemstone contiguously underlying its table, to produce indicia 10 as shown in FIG. 6. The holder 26 or 28, being laser-light transmissive, enables the incident laser beam 30 to vaporize the coating, engrave the underlying material and then to readily exit the interior of the gemstone, without substantial internal reflection. This action ensures that the gemstone is not damaged by heat or stresses during the engraving process.

Then either the holder 26 or 28 and/or its supporting table (not shown) is moved with respect to the laser marking apparatus 24, so that the next sequentially disposed gemstone 22 is within the line of the laser beam 30 to engrave its coated surface. This procedure is repeated until all of the gemstones 22 have been engraved.

If the holder 26 had been used to support the gemstones 22, its jaws 36A and 36B are then opened to enable the finished decorated gemstones to be removed therefrom and new undecorated gemstones inserted for engraving thereof. If the holder 28 had been used, the engraved gemstones are merely lifted up out of the grooves 42 and new undecorated gemstones inserted for engraving thereof.

It should be appreciated by those skilled in the art that if any exterior surface other than the table of the gemstone 22 is to be engraved, such action may require modification of the holders 26 or 28 to support the gemstones so that the surface to be engraved will be directed upward toward the laser beam.

It should also be appreciated by those skilled in the art, that while the subject invention has particular utility for providing large decorative indicia on semi-precious or man-made gemstones, without risking heat-induced injury thereto, it also has considerable utility for engraving the girdle of diamonds with identifying indicia which is not visible to the naked eye, to produce gemstones marked like those of the prior art. This action is achieved while minimizing, if not eliminating the danger of heat-induced damage to the diamond which would be caused by excessive internal reflections.

Without further elaboration the foregoing will so fully illustrate our invention that others may, by applying current or future knowledge, adapt the same for use under various conditions of service.

We claim:

1. Apparatus for engraving indicia on or below a predetermined exterior surface portion of a gemstone, the gemstone having another exterior surface portion, said apparatus comprising support means for supporting the gemstone thereon and laser means for generating a laser beam and for directing said beam to the predetermined exterior surface of the gemstone to engrave said indicia on or below said predetermined exterior surface, said support means including a girdle engaging recess which is constructed to engage the other exterior surface portion of the gemstone by contacting at least a portion of said other exterior surface portion in such a manner that a significant portion of said laser beam is precluded by said support means from reflecting internally within the gemstone or contacting said support means, thereby ensuring that the gemstone is not damaged by said laser beam.

2. The apparatus of claim 1 wherein the gemstone includes a peripheral girdle portion, the peripheral girdle portion forming the other exterior surface of the gemstone, and wherein said girdle engaging recess engages only the peripheral girdle.

3. The apparatus of claim 1 wherein said support means is formed of a laser-light transmissive material.

4. The apparatus of claim 3 wherein said laser-light transmissive material comprises a plastic material.

5. The apparatus of claim 3 wherein said laser light transmissive material comprises glass.

6. The apparatus of claim 1 wherein the gemstone has a laser-light absorbing coating applied to the predetermined exterior surface.

7. The apparatus of claim 6 wherein said coating is selected from the group consisting of paints, inks, and dyes.

* * * * *